United States Patent Office 3,375,082
Patented Mar. 26, 1968

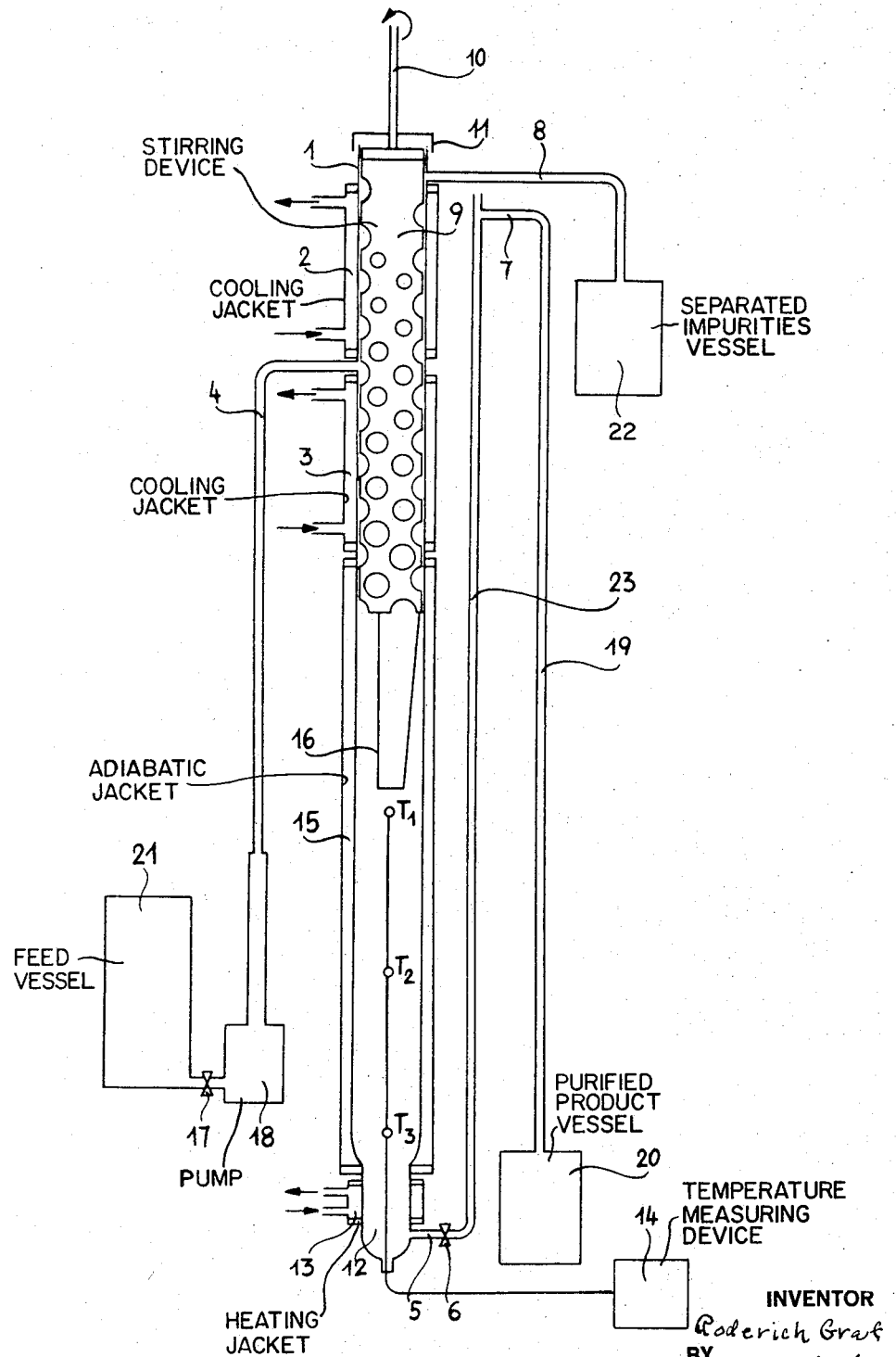

3,375,082
PROCESS FOR THE CONTINUOUS SEPARATION OF CRYSTALLIZABLE SUBSTANCES
Roderich Graf, Hofheim, Taunus, Germany, assignor to Farbwerke Hoechst Aktiengesellschaft vormals Meister Lucius & Brüning, Frankfurt am Main, Germany, a corporation of Germany
Filed Apr. 28, 1965, Ser. No. 451,559
Claims priority, application Germany, Apr. 29, 1964, F 92,741
5 Claims. (Cl. 23—295)

The present invention relates to a process and apparatus for the continuous separation of crystallizable substances.

Beside the known discontinuous zone melting process continuous processes are known for the separation of crystallizable substances, in particular for the separation of one or more undesired impurities from a product.

According to the process described in U.S. Patent 2,854,494, the crystallizable higher melting component of the mixture to be resolved, for example, p-xylene in admixture with its isomers, is converted into the crystalline state by cooling, the mass of crystals is continuously separated by mechanical means under pressure on a filter medium into the two phases, and the crystals which to a large extent are pure already are melted at the end of the column by means of a heating device, part of the melt being withdrawn from the system as pure product and another part being forced countercurrently through the crystal cake for rectification. The separating effect is supported by a pulsating pressure exerted on the melt.

According to another known process, the so-called column crystallization process, the mixture of substances to be separated which has been introduced into the apparatus in the molten state is cooled whereby crystals form at the top of a so-called annular-slot-type column, which are conveyed mechanically to the heated lower end of the column by means of a rotating steel screw arranged in the annular slot and closely adjacent to it. At the bottom of the column the crystal slurry is melted again and a current of molten pure substance is returned upwardly. Further quantities of the mixture to be separated are continuously added at an appropriate point of the column, so that a fraction of largely pure substance can be continuously withdrawn at the bottom of the column and a fraction comprising a product which is to a corresponding degree more impure than the starting product is withdrawn at the top of the column. Owing to the mechanism of the apparatus in which the crystals are conveyed downwardly by means of a screw, the substances of the lower warmer zone of less density are prevented from remixing with the substances of the upper cooler zone of higher density. This known process enables very pure compounds to be prepared on a laboratory scale. But the throughput of the laboratory size apparatus, which have hitherto been used is within moderate limits, so that the principle on which the aforesaid process is based has hitherto seemed to be hardly suitable for the realization of the process on an industrial scale.

Now I have found a process for continuously separating crystallizable substances, the solid phase of which has a higher specific gravity at the equilibrium melting point than the molten phase. The process according to the invention enables the rectifying crystallization which hitherto has only been carried out on a laboratory scale to be carried out in a relatively simple manner on an industrial scale. According to the invention the mixture of substances to be separated is continuously introduced at the top of a vertical rectifying column and the components crystallizing at a higher temperature are continuously discharged in the liquid phase at the bottom of the column. The mixture of substances to be separated is introduced into the column in the form of a solution in a solvent or mixture of solvents that has a lower specific gravity than the molten mass of the component crystallizing out at a higher temperature, and in which the substances to be separated are soluble, the solubility of the component crystallizing at a higher temperature having, moreover, to be a function of the temperature. The component crystallizing out at a higher temperature which after a dynamic state of equilibrium has formed deposits in the column under gravity in the form of a coherent crystal slurry, is melted at the bottom of the column and withdrawn from there in the form of a melt. The dilute solution containing the component crystallizing at a lower temperature is withdrawn at the top of the column.

According to the invention a solution of the mixture of substances is introduced at a point between the upper and the lower ends of a vertical column, the upper part of which is provided with a mechanically driven stirring device. Here, the component crystallizing out at a higher temperature is transformed in at least one zone by cooling into discrete individual crystals. Owing to the difference between their own weight and their floating weight the separated crystals of the component crystallizing out at a higher temperature sink to the bottom of the column via a middle part of the column which is heat insulated and which in particular serves for the rectification. After the column has been set in action and a coherent crystal slurry has formed, the aforesaid crystals are melted, that is to say converted into the liquid state, at the bottom of the column by the supply of heat. This operation gives rise to a reflux of pure molten product in the upward direction that is in a direction opposite to that of the sinking crystal slurry, whereby a dynamic state of equilibrium is brought about, the temperature and concentration decreasing in an upward direction. According to the invention, the drop of temperature and concentration is stable because of the fact that owing to the higher proportion of the auxiliary solvent having a lower specific gravity the drop in the density in the upward direction is greater than the increase of density brought about by the drop of temperature in the upward direction. The process according to the invention can therefore only be carried out under gravity as is likewise the case with distillation. The effect can be increased by a field of forces similar to gravitation as can be achieved, for example, by centrifugation of the apparatus system. But this requires a considerably increased capital outlay, and is not necessary in most cases.

The diffusion of the lighter solvent in a downward direction, which takes place independent of gravitation, and which in principle is the only factor which counteracts the desired aim, takes place so slowly as compared to the speed at which the crystals sink in the liquid phase surrounding them that its influence can be neglected. After an approximate state of equilibrium has been attained a highly concentrated solution or, depending on the operational conditions, a 100% melt of the product crystallizable at a higher temperature can be continuously withdrawn at the bottom of the column while at the top of the column a solution of the product that is crystallizable at a lower temperature is obtained. This solution is dilute as compared to the starting solution and contains the product that is crystallizable at a lower temperature in such a ratio as the solvent distributes between the fractions forming at the top and the bottom of the column, respectively.

In the process according to the invention it is particularly advantageous to dissolve the substances to be separated in a solvent or mixture of solvents whose density is smaller than that of the molten phase of the component obtained at the bottom of the column by at least one, preferably two or more units of the first decimal place.

The cooling of the top of the column which is necessary for separating the crystals from this solution introduced into the column may be brought about by a single cooling zone or by two or more cooling zones of different temperatures, the temperature prevailing in the individual cooling zones rising from the top to the bottom of the column. When two cooling zones are used it is advantageous to introduce the starting solution between the two cooling zones. When only one cooling zone is used, which is sufficient in most cases, the solution is introduced at the lower end of the cooling zone.

It is suitable to adjust the concentration of the starting solution in such a manner that the product crystallizing at a higher temperature is separated already when the solution is cooled by 10° C. and that upon a cooling by about 50° C. the solution is substantially free of such product, that is to say that the curve representing the solubility of the substance crystallizing out at a higher temperature shall be sufficiently steep in the operational temperature range. For in this case, owing to the higher content of the solvent of lower specific gravity, the density of the more dilute solution of the substance, which solution is in solution equilibrium with the solid phase at a lower temperature, is lower than that of the more concentrated solution of the substance, which solution is in solution equilibrium with the solid phase of the substance at a higher temperature. This is, however, only possible if the difference between the density of the solvent and the density of the liquid phase of the pure substance is sufficiently great and amounts to one or, preferable two or more, units of the first decimal place. The difference of density may also be smaller, provided that the curve representing the solubility of the substance to be purified is sufficiently steep.

When the temperature drops, the density of the liquid phase which is in equilibrium with the solid phase is in general reduced to a minimum and then again rises a little. This means that the temperature which is most advantageously used in the process according to the invention in the uppermost cooling zone is determined by the temperature at which the liquid phase of the system has the lowest density. It is advantageous to introduce the starting solution into the column at the point at which the solution contained in the column after the formation of the dynamic equilibrium has approximately the same density as the starting solution.

The quantity and kind of the solvent or mixture of solvents which is necessary for dissolving the mixture of substances to be separated depends in the first place on the mixture of substances to be separated and can easily be determined by preliminary tests. It has been found that the quantity of solvent or mixture of solvents required for the dissolution of a mixture of substances containing the component to be separated at the top of the column in a quantity of, for example, up to about 5% by weight has to be equal to about ten times the quantity by weight of the component to be separated at the top of the column. This means that, for example, in the purification of a substance containing about 1% of the impurity to be separated about 90 parts by weight of the starting product and about 10 parts by weight of solvent are to be used. If the amount of impurity is about 2%, about 20 parts by weight of solvent have to be used per 80 parts by weight of starting product.

The process according to the invention is applicable in the first place to the resolution of mixtures of two substances, in particular to the freeing of a product from impurities which cannot be separated in another way, for example, by a rectification by distillation. The process according to the invention is also applicable to the resolution of mixtures comprising more than two substances. In that case the component melting at a higher temperature is withdrawn at the bottom of the column as molten pure product and the other components are withdrawn at the top of the column in the form of a solution.

The process according to the invention may also be carried out in several stages in the following way: In a first column which is in continuous operation the component that can be crystallized at a higher temperature is concentrated in the melt withdrawn at the bottom of the column. The concentration is further increased by again dissolving the fraction withdrawn at the bottom of the first column in a solvent and introducing it into a second column, and so on, until the pure product is obtained at the bottom of the last column.

An apparatus embodying the invention will now be described in greater detail by way of example only with reference to the accompanying drawing.

Referring to the drawing, the apparatus according to the invention comprises a vertically arranged cylindrical tube 1 which in its upper third part is provided with external cooling jackets 2 and 3. The apparatus also comprises a pipe 4 arranged at the side of the tube and serving for the introduction of the starting solution; a pipe 6 arranged at the bottom of the column and serving for the withdrawal of the molten fraction forming at the bottom of the column; an overflow 8 arranged at the side of the tube above the uppermost cooling jacket and serving for the withdrawal of the fraction forming at the top of the column; a stirring device 9 inserted into the upper part of tube 1 and provided with a shaft 10 and a plate 11 covering the top of column 1; a heating jacket 13 arranged at the lower end of the column; an instrument 14 serving for measuring the temperature at several places and comprising measuring points T1, T2 and T3; and a jacket 15 arranged below the cooling jackets and serving for the adiabatic operation of the part of the tube 1 positioned between the cooling jacket and the heating jacket. Jacket 15 can advantageously be provided with a special heat insulation or be heated additionally when the melting point of the product to be withdrawn at the bottom of the column is much higher than the ambient temperature.

Stirring device 9 advantageously comprises a blade stirrer provided with asymmetrically arranged openings which in the interior part of the stirrer are circular and at the edges are semicircular and the dimensions of which are increased in a downward direction. At the lower end of the stirrer there is advantageously arranged a trapezoidal wire loop 16.

Stirring device 9 is advantageously coupled via shaft 10 with a programmed control not shown in the drawing serving to change the direction of rotation.

The cylindrical tube 1 which is the column proper advantageously tapers—as is shown in the drawing—at its closed lower end 12 into which opens a pipe 6 serving for the withdrawal of the fraction forming at the bottom of the column. The diameter of tube 1 is consequently smaller in the bottom part than in the other parts.

It is also advantageous to provide pipe 6 which is arranged at the bottom of the column with an ascending pipe 23 disposed in parallel with tube 1 and provided with an overflow 7.

Tube 1 which has a circular or nearly circular cross-sectional area is advantageously made of glass, metal or another material that cannot be attacked by the contents of the column and that is sufficiently transparent to heat and mechanically resistant. Through cooling jackets 2 and 3 (there may also be used one cooling jacket only or more than 2 cooling jackets), a cooling brine is introduced, the temperature of which is so that the component to be separated at the bottom of the column is eliminated in the form of crystals from the solution contained in the column.

The dimensions of stirring device 9 have to be such that the device is effective at least within the cooled parts of the column and prevents the eliminated crystals from sticking to the inner wall of the column and from intergrowing with one another. Further, it favours the heat transfer from the substances contained in the column to the cooling agent within the cooled zone. By the stirring movement the formation of discrete crystals is promoted as well as the formation of more compact crystals by recrystallization which is quite considerable in the lower part of the cooled zone. Owing to the special shape of the blade stirrer shown in the drawing the crystal slurry eliminated in the column is kept in cycloidal motion. The material of which the stirrer is constructed must, of course, have a certain degree of toughness and stiffness, on the one hand, and of elastic deformability and abrasion resistance, on the other hand. Particularly suitable materials are polyethylene, polypropylene and polytetrafluoroethylene. If column 1 is made of metallic material stirrer 9 may be made of the same material.

The speed of stirring is adapted in the first place to the crystallizability of the products to be separated. It is limited by the speed that is no longer sufficient to prevent the individual crystals from intergrowing and by the speed at which not only the desired purpose is attained, but which, moreover, leads to a quicker mixing of the various layers of different specific gravity which form. The optimum speed of stirring also depends on the radius of the column used, so that the speed of rotation may vary within wide limits which are determined by the above-mentioned factors. The speed of rotation is in general within the range of 5 to 60 revolutions per minute. However, the invention is not limited to the use of a speed within that limit and in special cases the most favorable speed may be outside the said range. In certain cases it is particularly advantageous to provide the motor moving the stirring device with an automatic control which enables the direction of rotation and the stirring pauses to be programmed, for example, in cases in which the product exhibits a tendency to stick to the stirrer in the form of crystal crusts in the upper cooling zone 2, in the lower part of which crystals are suspended in a relatively small amount. By programming the control device, for example, in such a manner that the stirrer turns for 5 minutes to the left, pauses for 15 seconds, in the course of which the stirring gear may cease moving, turns for 5 minutes to the right, pauses for 15 seconds, and so on, crystals that have deposited on the stirrer break off as the stirrer changes its direction of rotation, and this takes place long before the crystal deposits might cause working trouble in the column. It is not necessary to design the stirring device in such a manner that it transports the eliminated crystals in a preferred direction. In the process according to the invention it is sufficient that the direction in which the crystals move is exclusively subject to the gravitational field by the difference between the own weight of the crystals and their lift.

It is advantageous to pass through heating jacket 13 at the bottom of the column a heating liquid having a temperature that is by some degrees higher than the temperature corresponding to the equilibrium melting point of the substance. If the operation of the rectifying column is to be carried out continuously it is important to maintain the aforesaid temperature constant and it is advantageous to use a thermostat in this stage in which the dosed transformation of the crystalline phase into the molten phase takes place. The required heat of fusion may also be supplied by another kind of heating, for example, by electric heating which can be controlled by a thermostat. The temperature in the lower part of the column is advantageously measured by a sensible instrument for measuring the temperature at a plurality of places, which may, for example, be designed as a resistance thermometer. The apparatus shown in the accompanying drawing comprises, for example, three measuring points ($T_1$, $T_2$ and $T_3$). The instrument for measuring the temperature shall enable the temperatures within a coherent crystal slurry to be measured exactly to $1/10°$ C. at different levels of the crystallization column.

To start the operation, the column is filled up to upper overflow 8, by means of pump 18, with the solution of the mixture of substances contained in supply vessel 21. After the brine circulating in cooling jackets 2 and 3 has acted upon the contents of the column for some time and stirring device 9 has been set going crystallization starts in the upper part of the column either spontaneously or after the introduction of seed crystals. The crystals sinking in column 1 finally arrive at the bottom of the column where the temperature for some time sinks to a minimum. At the same rate as the crystals accumulating at the bottom of the column melt again by the supply of heat they lead to the accumulation of a solution of increasing concentration and, consequently, of the increasing density and, in the simultaneous presence of the crystalline phase, they lead to an increase of the equilibrium temperature which finally, after the melt formed by the crystals has lifted the solvent and eliminated it from the lower part of the column, is limited by the equilibrium melting point of the pure substance to be separated at the bottom of the column. In general this dynamic state of equilibrium is attained after several hours in the course of which a dosed stream of fresh solution is introduced into the column via middle pipe 4 and dilute solution, the concentration of which is determined by the temperature of upper cooling zone 2, is discharged via overflow 8. It is important that the mixing zone which contains a mixture comprising a liquid and a solid phase extends at least to about the middle of lower cooling zone 3. In the beginning the crystal slurry below the cooling zone has a loose, fluid consistency. In the course of some hours after the increased removal of the solvent in an upward direction within the rectification zone has set in, the crystals become progressively greater and more compact owing to recrystallization and finally form a coherent connected slurry of granular consistency and a high solids content. As soon as it can be seen from temperature measuring place $T_3$ that the equilibrium melting point has been attained the withdrawal of the fraction forming at the bottom of the column can begin. The circulation of heating agent in heating jacket 13 is then adjusted in such a manner that its temperature is some centigrades above the equilibrium melting point. An amount of bottom fraction is then uniformly withdrawn which is no greater than is sufficient to prevent a considerable drop of temperature at temperature measuring place $T_3$. This is ensured when the quantity of bottom fraction which is withdrawn per unit of time is smaller than the quantity of the crystalline phase that is melted per unit of time, so that a certain amount of molten pure substance flows back in an upward direction through the rectification zone (approximately in the space parallel to adiabatic jacket 15). As soon as the withdrawal of the molten bottom fraction begins an equivalent amount of the mixture of substances to be separated is introduced as fresh solution into the column via inlet pipe 4. For this purpose a certain quantity per hour of the fresh solution is introduced from feed vessel 21 via pump 18 into the column and by an appropriate adjustment of the height of overflow 7 for the bottom fraction care is taken that the level of the crystal slurry is maintained at a certain height, approximately at the level of pipe 4. The quantity of bottom fraction and top fraction which can be withdrawn then adjusts itself spontaneously. The indication of the temperature at measuring place $T_3$ can be made use of, for the automation in such a manner that, when the temperature drops at measuring place $T_3$ valve 6 which is arranged between pipe 5 and ascending pipe 23 is closed and is not released before a predetermined value has been attained. The differences of temperature between measuring places $T_1$, $T_2$ and $T_3$ may also be made use of for controlling the introduction of fresh solution, an increase of the differences beyond a setpoint having a choking effect on the introduction of fresh solution and leading to a regulation of the throughput. If the separating column according to the invention is to work economically it is necessary that it is in continuous operation.

Since when a crystallized substance is freed from an impurity which is contained in the product the impurity contained in the product to be purified remains in solution in the auxiliary solvent the impurity of the product distributes to the fractions forming at the bottom and the top of the column in the same proportion as the auxiliary solvent added distributes to the two fractions. Hence it follows that the purifying effect is highest when the content of solvent in the fraction forming at the bottom of the column smallest. When the curve representing the equilibrium temperature which can be deduced from the phase diagram is known the proportion of solvent contained in the bottom fraction follows immediately from the temperature indicated at measuring point $T_3$, the said proportion taken together with the percent content of the solution used and the percent content of the bottom fraction being important with regard to the judgment of the purification effect.

The separation or purification effect of the process according to the invention depends on a plurality of factors, for example, on the mixing proportion between the mixture of substances to be separated and the auxiliary solvent, on the speed of throughput, i.e. the speed at which the fresh solution is supplied and the fractions forming at the top and the bottom of the column are withdrawn, on the length and the quality of the thermal insulating material of axiabatic jacket 15 (rectification zone), on the difference of density between the crystallized phase and the liquid phase, on the speed of crystallization, on the viscosity of the solution, on the tendency of the solution towards supersaturation, on the formation of crystals having a form that is favorable for the process of the invention and on the cryoscopic behaviour of the system formed of product to be purified, solvent and impurities.

In general, an increase of the throughput brings about an increase of the proportion of solvent in the bottom fraction and, consequently, a diminution of the purifying effect. On the other hand, the speed of reflux must not exceed a certain limit if this would disturb the rectification process in the middle part of the column. The speed of throughput has therefore to be adapted to the desired degree of purity. The limits to be observed depend on the system of substances used and on the above-mentioned factors. An increased difference of pressure between the crystallized phase and the liquid phase, a higher speed of crystallization and a stronger tendency towards recrystallization, the formation of crystals which have a form that is as stumpy as possible and which do not contain portions of the liquid phase have proved to be particularly suitable in the process according to the invention.

The process according to the invention can be used with particular advantage for the fine purification of crystallizable products which contain a proportion of impurities that is not greater than some percent by weight. The process is applicable for this purpose in particular in cases in which the proportion of residual impurities in the purified product shall not be higher than at least some hundred p.p.m. as desired, for example, in the case of many monomers before their polymerization into products of high molecular weight and in which a purification by distillation would not lead to the desired result or would be too expensive owing to the necessity of using an excessively high number of plates or too high a proportion of reflux or, for example, in cases in which a purification by distillation cannot be applied because of the tendency of the monomer towards autodymerization at an elevated temperature.

The following examples in which special systems of substances are used serve to illustrate the invention but they are not intended to limit it thereto.

*Example 1*

4,4-dimethyl-acetidinone-(2) (melting point 15.25° C.) which contained 0.1% by weight of isopentenoic-(3)-acid amide and 0.3% by weight of β-hydroxyisovaleric acid nitrile in addition to 0.2% by weight of other oily impurities was to be largely freed from the said impurities. It was in particular important to remove the isomeric β-hydroxyisovaleric acid nitrile which cannot be removed by distillation, to as large a degree as possible.

The rectification column used in the purification process was of the type illuustrated in the drawing. It had a total length of 1250 mm. and an internal diameter of 160 mm. Feed vessel 21 was filled with a solution consisting of 90% by weight of starting product and 10% by weight of diisopropyl ether as an auxiliary solvent. In order to put the apparatus in action the column was filled, by means of feed pump 18, with the starting solution up to the level of cooling jackets 2 and 3, at most up to the level of upper overflow pipe 8. The lower cooling jacket 3 was kept at −3° C. by circulating brine and upper cooling jacket 2 was kept at −18° C. Stirrer 9 was adjusted to a speed of 20 revolutions per minute the direction of rotation changing each time after a period of 5 minutes and an interruption of 15 seconds during which the stirring mechanism came to a stop. After the fresh solution that had been pumped in had cooled to such an extent that the separation of crystals of dimethyl acetidinone began either spontaneously or after the addition of seed crystals the space below the stirrer first filled with loose needle-shaped crystals and at instrument 14 which measured the temperature at a plurality of points temperature feeler $T_3$ indicated a minimum temperature of about +10° C. which had been attained for a short time. The crystals melted in the lower melting zone which in the beginning was kept at about 15° C., and they formed a concentrated solution of higher density, the equilibrium temperature of which gradually rose. In the course of some hours the individual crystals in the lower stirred zone and in the rectification zone became larger and more stumpy due to recrystallization and formed a coherent connected dense crystal slurry below the stirrer. The edges of the stumpy individual crystals had a length of about 2 mm. Within the stirred zone the gritty crystals formed a moved slurry which was distinctly separate from the solution of lower density which was above the slurry in the equilibrium of temperature. In the column a drop of temperature in an upward direction formed which remained until after about 8 hours the equilibrium melting temperature of 4,4 - dimethylacetidinone - (2) which was at 15.25° C. had been attained at the bottom of the column. The temperature of the liquid circulating in heating jacket 13 was then adjusted to 18° C. by means of a thermostat.

As soon as the last-mentioned state of equilibrium had been attained the operation was carried out continuously and about 200 cc. of the solution contained in feed vessel 21 were introduced per hour into the column. After the liquid level had risen to the level of upper overflow pipe 8 the height of the overflow for the bottom fraction was adjusted so that about 155 to 165 cc. of the bottom fraction which had a specific gravity of about 0.973 flowed over per hour and the level of the stirred crystal slurry was approximately in the altitude of inlet pipe 4. About 35 to 45 cc. of the top fraction which had a specific gravity of 0.77 flowed over per hour through upper overflow 8.

The fraction withdrawn at the bottom of the column via ascending tube 23 contained less than 0.05% by weight of the diisopropyl ether used as auxiliary solvent. While the fraction was withdrawn the equilibrium temperature indicated at the measuring point sank by no more than some 0.01° C. The purification effect (p.e.) which is defined by the following equation $$P.E. = \frac{m(100-p)}{p(100-m)}$$

in which $p$ represents the percentage by weight of product to be purified contained in the starting solution and $m$ is the percentage by weight of purified product contained in the bottom fraction, amounted to 222, calculated according to the aforesaid equation. The proportions of isopentenoic acid amide and hydroxyisovaleric acid nitrile contained in the purified product were 4.5 p.p.m. and 13.5 p.p.m., respectively. Under the conditions of analysis that were applied the aforesaid impurities were no longer indicated by the gas chromatogram of the purified product.

The top fraction withdrawn via overflow 8 contained 80% by weight of solvent. Hence follows that the degree of concentration of impurity was 36. The impure lactam (about 3% of the original product) which had been separated from the top fraction by a distillation in vacuo without fractionation contained about 4.5% of amide, 11% of oxynitrile and 7% of other impurities as was ascertained by an analysis by gas chromatography.

*Example 2*

In a fractionating column of the same design as that used in Example 1, but which had a total length of 2500 mm. and an internal diameter of 195 mm. commercially available 4,4-dimethylacetidinone-(2) which as chief impurities contained 0.4% of isopentenoic acid amide and 1.2% of β-hydroxyisovaleric acid nitrile and which was dissolved in diisopropyl ether in the form of a solution 72.5% strength by weight was purified under the same conditions as those in Example 1.

In continuous operation about 0.8 liter of the solution was introduced per hour and about 0.5 liter of bottom fraction was withdrawn per hour. The purified lactam contained less than 0.01% by weight of solvent (ascertained by gas chromatography) and no detectable quantities of the impurities originally contained in the product.

*Example 3*

150 parts by weight of a mixture formed of 80 parts by weight of a commercially available dimethyl sulfoxide which according to an analysis by gas chromatography contained about 1.8% by weight of impurities, in particular dimethyl sulfide, and of 20 parts by weight of isopropyl chloride were introduced per hour into the fractionating column used in Example 1 after a state of equilibrium had been attained. 110 parts by weight of dimethyl sulfoxide were withdrawn per hour as bottom fraction. According to gas chromatography the dimethyl sulfoxide withdrawn at the bottom of the column contained less than 0.01% by weight of isopropyl chloride and no other foreign constituents.

*Example 4*

Crude commercially available crotonic acid was freed from its impurities. The crude acid was a yellow mass of crystals to which oily impurities adhered. It contained about 95.5% of crotonic acid and about 4.5% of impurities.

The purification was carried out in a rectification column having only one cooling zone. The column had a total length of 1300 mm. and an internal diameter of 50 mm. The cooling zone had a length of 240 mm. Above the cooling jacket and about 30 mm. below the upper end of the column there was arranged an overflow for the solvent to be withdrawn at the top of the column together with the impurities. At the tapered lower part of the column a capillary tube provided with electric heating was arranged instead of the heated ascending tube (5, 23) shown in the drawing. Before the column was put into operation the capillary tube was filled with pure molten crotonic acid which was allowed to solidify in the capillary tube and thus reliably closed it. Through the lower end of the column a thermometer had been introduced, the ball of which was positioned in the rectification part at a distance of about 10 cm. from the bottom of the column. The rectification part had a length of 700 mm. and was rovided with a hose for heating which had a diameter of 18 mm. and was wound 20 times around the column in such a manner that the distance between the individual windings was approximately equal to the width of the hose. Around the lower part of the column a tube having a length of 8 meters and an inside diameter of 10 mm. was wound, the windings being closely one beside the other. The end of the tube wound around the lower part of the column was connected with the beginning of the hose wound around the rectification part. The heating tubes were fed by means of a thermostat with water having a temperature of 72° C.±0.1 to 0.2° C. The hose wound around the rectification part was externally covered with a threefold layer, each individual layer consisting of a sheet of polyvinyl chloride having a thickness of 1 mm. The dimensions of the stirrer were 600 mm. x 50 mm. x 6 mm. At its lower end it was provided with a wire of refined steel having a diameter of 2 mm. and a total length of about 15 cm., which was bent in the form of a trapezium and served as an auxiliary stirrer. The ratio between the perforated area and the strap area was 2:1 at the lower end and 1:3 at the upper end. The heating of the withdrawal capillary tube at the bottom of the column was adjusted by means of a time relay in such a manner that when the column was in continuous operation it was switched on for 6 minutes per hour. During this period about 50 grams of pure crotonic acid were withdrawn.

In order to put the column into operation the water circulating in the heating tubes in the lower part and in the rectification part of the column was first adjusted to a temperature of about 60° C. Then the column was filled up to approximately half the height of the cooler with the starting mixture which was constituted of a filtered solution having a temperature of 60° C. and comprising 2 parts by weight of crude commercially available crotonic acid and 0.7 part by weight of diisopropyl ether. During the introduction of the solution the stirrer moved at a speed of 30 revolutions per minute (30 seconds to the right, 3 seconds' pause, 30 seconds to the left, 3 seconds' pause). The cooler was fed with water having a temperature of 15° C. The crystals which very soon formed in the cooler sank and melted again when sinking into the rectification part. After a distinct crystal zone and, above it, a transparent zone of liquid which was almost free from crystals had formed in the cooler a further quantity of starting mixture coming from feed vessel 21 which contained the above-mentioned starting mixture, was introduced into the column at such a rate that the crystal level remained near the lower end of the cooler. After the sinking crystals had reached the lower part of the column the tempearture of the circulating water was increased to 72° C. In the course of about 24 hours the temperature indicated by the thermometer in the lower part of the column rose to 7° C., which is the equilibrium melting point of the pure acid. Henceforth, the column was operated continuously. The heating of the withdrawal capillary tube was switched on via a time relay for 6 minutes per hour. During each of these periods of six minutes about 50 grams of crotonic acid could be withdrawn. When opearting continuously the following throughputs could be attained per day.

Starting material: 1880 grams of a mixture comprising 1382 grams of crude acid having a melting point of 66° to 67° C. and 498 grams of diisopropyl ether.

Discharged material: 1200 grams of pure crotonic acid having a melting point of 71.2° C. and containing at least 99.8% of crotonic acid and at most 0.2% of diisopropyl ether.

The top fraction which amounted to 680 grams contained 494 grams of solvent and 185 grams of crotonic acid and impurities.

I claim:

1. A process for a continuous separation by rectification crystallization of a mixture of crystallizable substances, containing at least two components crystallizing at a higher and lower temperature with respect to each other, a solid phase of said mixture having a higher specific gravity at its equilibrium melting point than its molten phase, said rectification being carried out in a vertical rectification zone, in which at least three different temperature zones are present, an upper zone being at the lowest temperature, an intermediate, adiabatic zone being at a temperature intermediate the upper zone and a lower zone, which lower zone is at the highest temperature, this temperature corresponding to a temperature at least at which the component crystallizing at a higher temperature melts, said process comprising the steps of:
   (a) continuously introducing into the upper zone of the rectification zone, the mixture of substances to be separated, dissolved in at least one solvent, said solvent having a lower specific gravity than a melt of the component which crystallizes out at a higher temperature, said mixture of substances being soluble in said solvent and variably soluble in said solvent depending on temperature;
   (b) cooling in the upper zone the introduced mixture while maintaining the upper zone at a temperature at which the liquid phase of the mixture of components has the lowest specific gravity to obtain at least crystals of the component crystallizing at a higher temperature;
   (c) forming and maintaining in the intermediate, adiabatic zone a dynamic state of equilibrium between the crystals of the component which crystallizes at a higher temperature and its melt, and wherein said component crystallizing at a higher temperature forms a crystal slurry at an equilibrium melting point;
   (d) measuring the temperature at a plurality of points in the intermediate, adiabatic zone;
   (e) collecting by means of gravity, at the bottom of the rectification zone in the lower zone, said crystal slurry of the component crystallizing at higher temture;
   (f) melting said collected crystal slurry in the lower zone;
   (g) modifying the heat input to the lower zone responsive to the temperature measured at the plurality of points in the adiabatic zone;
   (h) withdrawing said component crystallizing at a higher temperature from the bottom of the rectification zone in the form of a melt; and
   (i) withdrawing a solvent solution containing the component crystallizing at a lower temperature from the top of the rectification zone.

2. A process as claimed in claim 1, wherein the substances to be separated are dissolved in at least one solvent having a density smaller by at least one unit of the first decimal place from that of the molten phase of the component obtained at the bottom of the rectification zone.

3. A process as claimed in claim 1, wherein the quantity of solvent, in which the mixture of substances to be separated is dissolved, is about 10 times the quantity by weight of the component to be separated at the top of the rectification zone.

4. A process according to claim 1, wherein a starting solution of the mixture of crystallizable substances and a solvent is introduced into the rectification zone at a point at which the solution contained in the rectification zone, after the formation of the dynamic state of equilibrium, has approximately the same density as the starting solution.

5. A process as claimed in claim 1, wherein the solution introduced into the rectification zone is brought to a desired temperature by means of a fourth temperature zone which is above the upper zone and at a lower temperature than the upper zone.

References Cited

UNITED STATES PATENTS

| | | | |
|---|---|---|---|
| 1,347,350 | 7/1920 | Moore | 23—301 |
| 1,560,473 | 11/1925 | Howard | 23—273 |
| 2,427,042 | 9/1947 | Bowman | 23—273 |
| 2,459,869 | 1/1949 | Christensen | 23—301 |
| 2,724,640 | 11/1955 | Crewson | 23—273 |
| 2,744,059 | 5/1956 | Mayer | 260—707 |
| 2,757,126 | 7/1956 | Chan | 260—707 |
| 2,823,242 | 2/1958 | McKay | 62—58 |
| 2,990,256 | 6/1961 | Lovins | 23—273 |
| 3,051,455 | 8/1962 | Magesten | 259—8 |
| 3,161,591 | 12/1964 | Pelter | 259—4 |

FOREIGN PATENTS

| | | |
|---|---|---|
| 560,240 | 11/1958 | Canada. |

NORMAN YUDKOFF, *Primary Examiner.*

G. P. HINES, *Assistant Examiner.*

UNITED STATES PATENT OFFICE
CERTIFICATE OF CORRECTION

Patent No. 3,375,082                        March 26, 1968

Roderich Graf

It is certified that error appears in the above identified patent and that said Letters Patent are hereby corrected as shown below:

Column 12, line 42, "Chan" should read -- Cahn --; line 49, "560,240" should read -- 566,240 --.

Signed and sealed this 29th day of July 1969.

(SEAL)
Attest:

Edward M. Fletcher, Jr.                      WILLIAM E. SCHUYLER, JR.
Attesting Officer                             Commissioner of Patents